United States Patent Office 3,394,209
Patented July 23, 1968

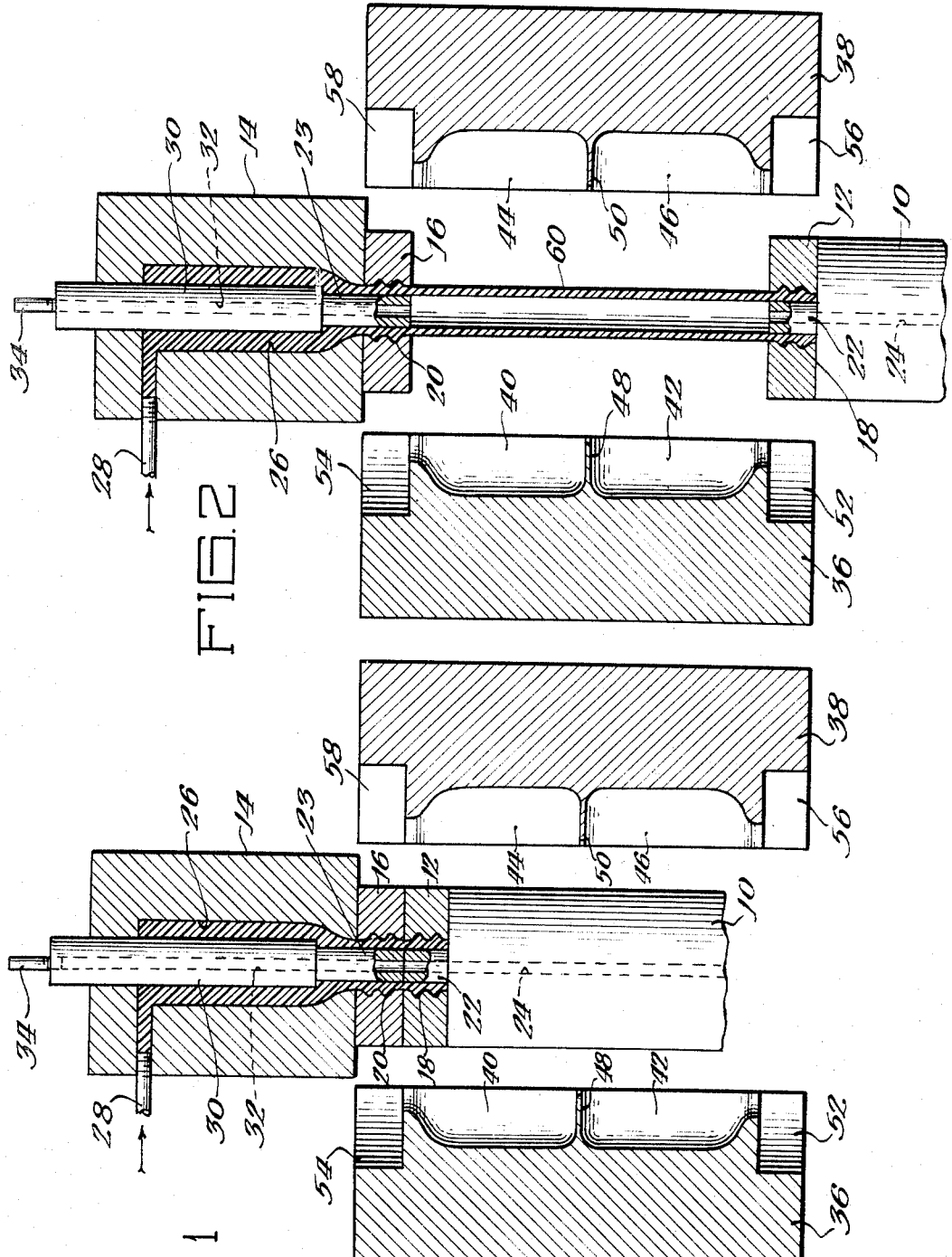

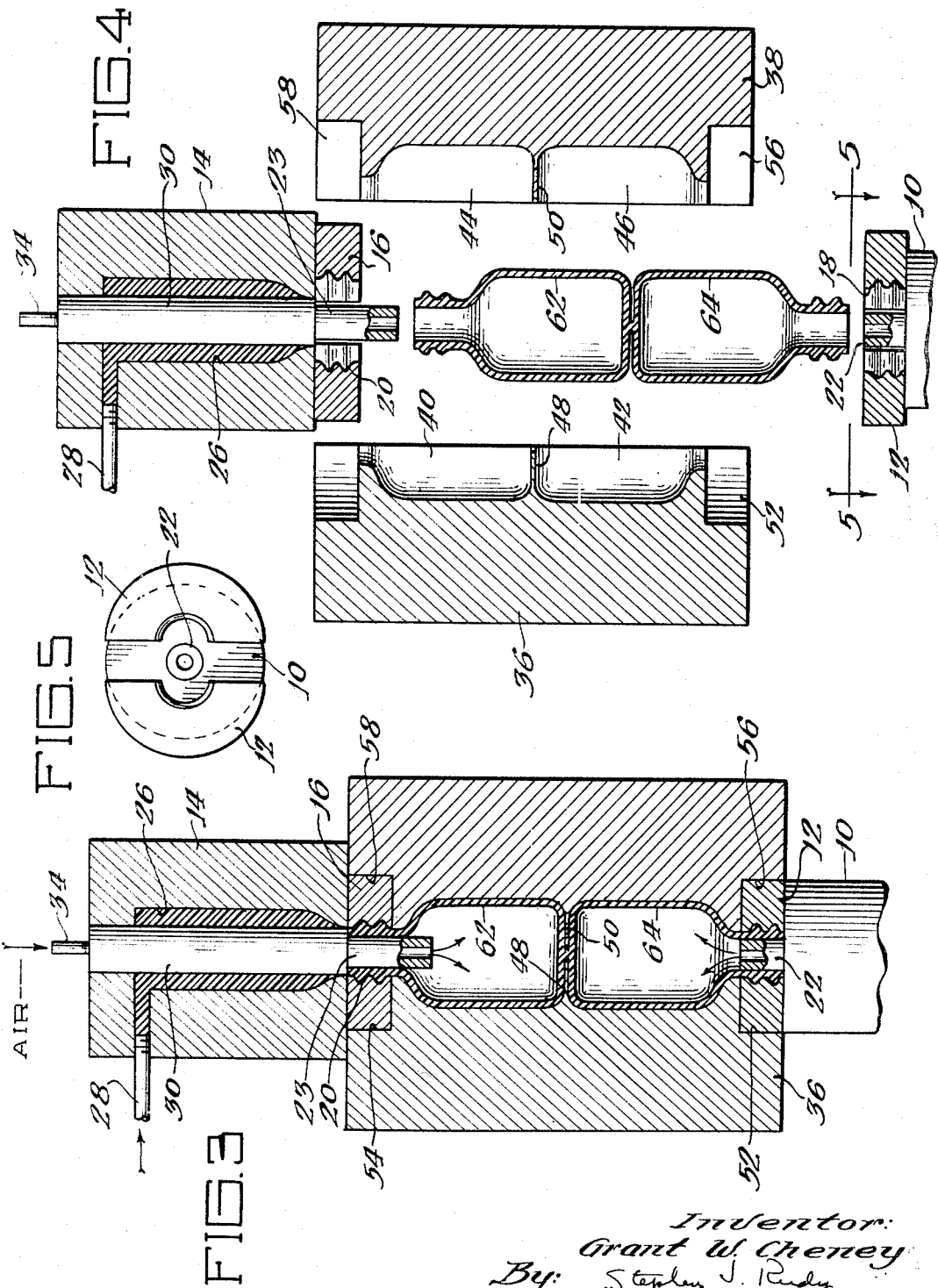

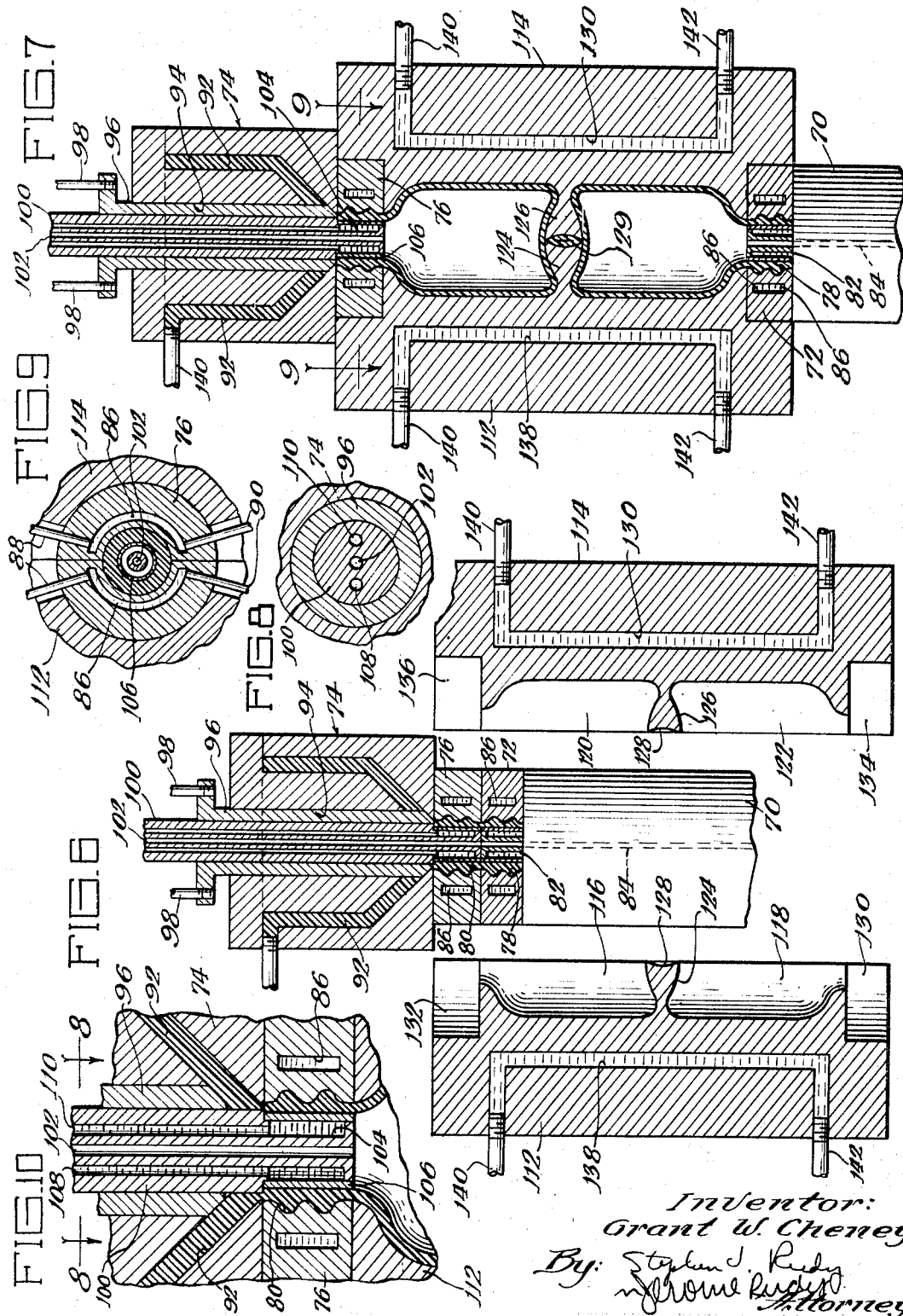

3,394,209
METHOD AND APPARATUS FOR BLOWING PLASTIC BOTTLES
Grant W. Cheney, Midland, Mich., assignor to The Dow Chemical Company, Midland, Mich., a corporation of Delaware
Filed May 9, 1960, Ser. No. 27,775
31 Claims. (Cl. 264—97)

This invention relates to an improved method for molding hollow items, and more particularly to a method whereby a plurality of plastic bottles may be simultaneously produced in a molding die.

The present invention pertains to a method for the simultaneous molding of two complete plastic bottles in a single split type die. It produces bottles of good dimensional tolerance, which bottles may be in finished form, or in substantially finished form, upon removal from the molding die.

The method of the present invention greatly increases production with very little increase in labor and/or machine cost. As a result, the method of the invention provides highly economical production of thermoplastic bottles, and similar items.

The main object of this invention is to provide an improved method which results in highly economic production of thermoplastic bottles.

A more specific object of the invention is to provide a method whereby more than one thermoplastic bottle may be formed in a single die and during a single molding operation.

Another object of this invention is to provide a method for the production of more than one thermoplastic bottle in a single mold, which bottles may be removed in finished form, or in substantially finished form, from the mold.

Still another object of the invention is to provide a method for the production of more than one bottle in a single mold, which bottles display good dimensional tolerance.

These and further objects and features of the invention will become more apparent from the following description and accompanying drawings wherein:

FIG. 1 is a schematic illustration showing in cross-section the relative position of various parts of a molding machine which may be used to practice the method of the invention, and showing said parts during the initial phase of bottle molding operations, namely, wherein two bottle neck portions are being molded;

FIG. 2 is the same but showing the drawing of a plastic tube formed integral with the bottle neck portions;

FIG. 3 is the same but showing the position of various parts during the blowing of the tube into engagement with multiple die cavities;

FIG. 4 is the same but showing the position of the various parts for removal of the multiple formed bottles;

FIG. 5 is a section view generally as seen along the line 5—5 in FIG. 4;

FIG. 6 is similar to FIG. 1 but showing a modified arrangement embodying the principles of the invention;

FIG. 7 is the same as FIG. 6 but showing the position of various parts during blowing of a tube into engagement with multiple die cavities;

FIG. 8 is a section view generally as seen along line 8—8 in FIG. 10;

FIG. 9 is a section view generally as seen along line 9—9 of FIG. 7; and

FIG. 10 is an enlarged fragmentary section view of a portion of the arrangement illustrated in FIG. 7.

Referring now to the drawings and more particularly to FIG. 1, the numeral 10 identifies a reciprocable plunger, or shaft, which supports at its upper end a split type, bottle neck portion molding die 12. Means (not shown) are provided to maintain the die 12 in closed position upon the plunger 10, and subsequently to open the die during bottle removing operation, as will be described hereinafter. An extruding head 14 is adapted to maintain upon its lower surface a split type, bottle neck die 16 which is similar to the die 12. Means (not shown) are provided for maintaining the die 16 in closed position, and for subsequently opening the die during bottle removing operation. The stroke of the plunger 10 is arranged so that in uppermost position the die 12 will be held in abutting relation with the die 16 as shown. The dies 12 and 16 are each formed with a hole having spiral grooves, or serrations 18 and 20 respectively, adapted to provide a thread upon a bottle neck portion formed therein. A mandrel 22, projecting upwardly from the plunger 10 a distance equal to the thickness of the die 12, is arranged centrally, or axially relative to the die opening containing groove 18. A passageway 24 extends axially through the plunger 10 and the mandrel 22, which passageway is adapted to conduct a pressurized fluid medium, such as compressed air, for bottle blowing purposes as will be seen hereinafter.

The extruding head 14 is formed to provide an inner recess, or cavity 26 which opens at the lower end of the extruding head 14, and is concentrically arranged relative to the threaded opening 20 of the die 16. A pipe, or tube means 28 is arranged to conduct a molten plastic material into the extruding head cavity 26. A reciprocable mandrel or core pin assembly 30 is arranged in the extruding head 14, the lower end 23 of said mandrel assembly being of reduced diameter with a portion thereof projecting beyond the lower surface of the extruding head, a distance equal to the thickness of the neck die 16, and being arranged in spaced relation to the spiral groove opening 20 therein. When the mandrel assembly 30 is in uppermost position (FIGS. 1 and 2), plastic material may flow under pressure out of the recess opening and about the reduced diameter portion 23; when the mandrel assembly is in lowermost position (FIGS. 3 and 4), the larger diameter portion thereof will close the recess opening and prevent, interrupt or terminate flow of plastic material out of the extruding head recess 26. The mandrel assembly 30 is formed to provide a passageway 32 axially arranged therein, which passageway is adapted to receive at its upper end, a pipe or tube 34 adapted to conduct a pressurized fluid medium, such as compressed air, to the mandrel assembly for bottle blowing purposes, as will be more clearly seen hereinafter.

A split type molding die, including symmetrically arranged die halves 36 and 38, is arranged for movement toward and away from each other. The die half 36 is formed to provide a pair of semi-circular cavities 40 and 42, while the die half 38 is formed to provide a pair of semi-circular cavities 44 and 46. It will be seen when the split dies 36 and 38 are moved together, the cavities 40 and 44 will define the walls of a first bottle, while the cavities 42 and 46 will define the walls of a second bottle separated from the first bottle by a web means 48 and 50 formed integral with the die halves 36 and 38 respectively. The die half 36 is further arranged to provide a semi-circular cavity 52 at the lower end, and a semi-circular cavity 54 at the upper end, while the die half 38 is formed to provide a semi-circular cavity 56 at the lower end and a semi-circular cavity 58 at the upper end. When the die halves 36 and 38 are moved together, the die cavities 54 and 58 embrace the neck portion die 16, while the die cavities 52 and 56 embrace the neck portion die 12, as seen in FIG. 3.

The use of the above described apparatus for practicing the method of the invention will now be described.

In initial stage of operation, the die halves 36 and 38 are spaced apart, and the plunger 10 is moved upwardly so that the bottle neck die 12 engages the bottom of the bottle neck die 16. Molten plastic material under pressure is then injected downwardly within the space defined by the spiral groove portions 18 and 20 and mandrel ends 22 and 23 to form two bottle neck portions as illustrated in FIG. 1.

Next, the plunger 10 is drawn downwardly and simultaneously, plastic material is forced through the bottle neck portion fomed in the neck portion die 16, to form an elongated plastic tube 60, integral with the bottle neck portions in the neck portion dies 12 and 16 and of substantially no greater outer diameter than an outer diameter of the neck portion, as shown in FIG. 2.

The die halves 36 and 38 are next moved toward engaging relationship resulting in the pinching of the plastic tube 60 at a mid-portion by reason of the web means 48 and 50, which pinching results in the welding of the inner walls of the tube 60 along a line, and forming the tube into two sections. A fluid pressure medium, such as compressed air is then fed into the interior of the tube sections via passageways 24 and 32 to expand the tube sections into engagement with the walls of the die cavities 42, 46 and 40, 44 respectively to form two plastic bottles 64 and 62, as shown in FIG. 3. The plastic bottles thus formed will be joined at the bottom end along the weld line caused by the pinching of the tube, as described.

The die halves 36 and 38, as well as the neck dies 12 and 16, are next moved apart to provide clearance with the formed bottles, and the plunger 10 is moved downwardly a distance so that the open end of the bottles clear the mandrels 22 and 23, whereupon the formed bottles may be removed from the molding dies as shown in FIG. 4. The joined bottles 62 and 64 are then separated by any suitable means, such as a knife edge (not shown), and are now ready for filling or placed in storage for future use.

It is to be noted that the completed bottles require little or no further trimming or finishing operations once they are separated, the method of the invention providing for blown thermoplastic bottles in finished form and ready for use.

A modified arrangement embodying the principles of the invention is illustrated in FIGS. 6 to 10 inclusive. Briefly, the modified arrangement differs from that disclosed hereinbefore, by (1) providing a tube squeezing, or cutoff means, whereby the blown bottles may be removed from the mold in substantially separated condition, (2) by use of an individually operated gate valve for control of plastic flow into the molding die, and (3) by the provision of cooling means for the molded bottles.

As seen in FIG. 6, the arrangement includes a reciprocable plunger, or shaft 70, which supports at its upper end a split type, bottle neck portion molding die 72. Means (not shown) are provided to maintain the die 72 in closed position upon the plunger 70, and subsequently to open the molding die 72 during bottle removing operations. An extruding head 74 is adapted to maintain upon its lower surface a split type, bottle neck molding die 76, which is similar to the die 72. Means (not shown) are provided for maintaining the die 76 in closed position, and for subsequently opening the die during bottle removing operations. The stroke of the plunger 70 is arranged so that in uppermost position, the die 72 will be held in abutting relation with the die 76 as shown. The dies 72, 76 are each formed with a hole having spiral grooves, or serrations 78, 80 respectively, adapted to provide a thread upon a bottle neck portion formed in each die. A mandrel 82, projecting upwardly from the plunger 70 a distance equal to the thickness of die 72, is arranged centrally, or axially relative to the die opening containing the groove 78. A passageway 84 is arranged to extend axially through the plunger 70 and the mandrel 82, which passageway is adapted to conduct a pressurized fluid medium, such as compressed air, for bottle blowing purposes.

The split type die 76 is formed to provide a curved passageway 86 spaced a uniform distance from the grooved opening 80, as best seen in FIG. 9. Pipe, or tube means 88, 90 are arranged for conducting a cooling liquid through each curved passageway 86. A similar cooling passageway arrangement is provided in the neck portions of the die 72.

The extruding head 74 is formed to provide an inner recess, or cavity 92 the lower end of which opens onto a hole 94 formed axially in the extruding head. Slidably arranged in the hole 94 for reciprocable motion, is a sleeve valve 96 adapted to control flow of plastic material from the cavity 92 into the molding die. Motive means (not shown) are connected to rods 98 to effect reciprocable motion of the sleeve valve 96. It will be seen (FIG. 10) that in raised position of the sleeve valve 96, plastic material may flow from the recess 92 into the neck portion of the split dies 76 and 72, while in the lower-most, or closed position (FIG. 6), the sleeve valve 96 restricts and regulates flow of plastic material into the split dies. It is to be noted that in closed position of the sleeve valve 96, the lower end thereof covers an upper edge region of a formed bottle neck portion thus eliminating the need for trimming operations on a bottle formed in a molding die. The lower end region of the bottle neck portion formed in molding die 72, abuts the top of the plunger 70, thus providing a finished edge requiring no trimming operation.

The sleeve valve 96 slidably engages a mandrel 100, the lower end of the mandrel extending into the threaded opening 80 a distance equal to the thickness of the split die 76. A passageway 102 is axially arranged in the mandrel 100, which passageway is adapted to conduct a pressurized fluid medium, such as compressed air, for bottle blowing purposes. The lower end of the mandrel 100 is formed with a peripheral recess 104 which is enclosed by a sleeve means 106. A pair of passageways 108, 110, are provided in the mandrel 100, the lower end of said passageways opening into the recess 104. Means (not shown) are arranged for conducting o cooling liquid through the passageway 108 and out of the passageway 110, whereby the lower end portion of the mandrel may be cooled. Similar means are provided in the mandrel 82 and shaft 70, for cooling the mandrel 82.

A split type molding die, includes symmetrically arranged die halves 112, 114, adapted for movement toward and away from each other. The die half 112 is formed to provide a pair of semi-circular cavities 116, 118, while the die half 114 is formed to provide a pair of semi-circular cavities 120, 122. It will be seen that when the die halves 112 and 114 are moved together, the cavities 112 and 120 will define the walls of the first bottle, while the cavities 118 and 122 will define the walls of the second bottle, separated from the first bottle by a web means 124 and 126 formed integral with the die halves 112 and 114 respectively. The vertical face of each web means is formed with a concave recess 128 adapted to provide a waste material cavity 129 to receive a portion of a plastic tube during tube pinching operation, as will be more clearly seen hereinafter.

The upper and lower edges of the recess form contiguous knife-like edges whereby the plastic tube is severed after it has been pinched together to form a weld line sealing the bottom of each bottle. The die half 112 is further arranged to provide a semi-circular cavity 130 at the lower end, and a semi-circular cavity 132 at the upper end, while the die half 114 is formed to provide a semi-circular cavity 134 at the lower end, and a semi-circular cavity 136 at the upper end. When the die halves 112 and 114 are moved together, the die cavities 130 and 134 embrace the neck portion die 72, while the die cavities 132 and 136 embrace the neck portion die 76, as seen in FIG. 7. Within the walls of the die halves 112 and 114 are provided a plurality of passageways 138 which are served by pipe, or tube means 140 and 142, adapted to conduct a cooling liquid through the die halves for cooling the walls of the die cavities.

The sequence of operations for forming bottles with the use of the modified arrangement, is identical with that described in connection with the embodiment illustrated in the FIGS. 1 to 5 inclusive. The main difference which the modified arrangement displays, is that closing action of the split dies 112 and 114, results in the severing of the adjoining bottom portions of the bottles, so that on removal from the molding die, no further separating or trimming operations are required. As best seen in FIG. 7, the portion of the tube embraced by the flanges 124, 126, will be enclosed within the waste material cavity 129, which waste material will be removed when the molded bottles are taken from the molding die.

No specific mestion has been made of the type of plastic material usable in the practice of the method of the invention, however, it is to be understood that any organic material having the necessary degree of elasticity, and adapted to be used for blow molding plastic bottles, such as normally solid polyolefins, particularly polyethylene, polypropylene, copolymers of ethylene and propylene and the like, polystyrene and similar alkenyl aromatic resins and rubber modified variations thereof, vinyl chloride polymers, nylon and so forth, may be satisfactory.

The foregoing description has been given in detail without thought of limitation since the inventive principles involved are capable of assuming other forms without departing from the spirit of the invention or the scope of the following claims.

What is claimed is:

1. In a method for blow molding a thermoplastic bottle which method includes the steps of injecting a given quantity of molten plastic material into a molding die to form a bottle neck portion, and subsequent to formation of said bottle neck portion, extruding additional molten plastic material into the die and through the molten neck portion to form a parison integral with said neck portion.

2. In a method for the manufacture of blow molded thermoplastic bottles wherein a given quantity of molten plastic is extruded into a molding die to form a bottle neck portion and a parison integral therewith, and a fluid medium is inroduced into the parison to form it into a bottle within the molding die, the improvement comprising extruding molten plastic material through the molten bottle neck portion after formation thereof to form said parison.

3. In a method for the manufacture of blow molded thermoplastic bottles according to claim 2, wherein the thermoplastic material is a normally solid polyolefin.

4. In a method for the manufacture of blow molded thermoplastic bottles according to claim 2, wherein the thermoplastic material is polyethylene.

5. In a method for blow molding a thermoplastic bottle which method includes the steps of injecting a given quantity of molten plastic material into a molding die to form a bottle neck portion, and subsequent to formation of said bottle neck portion, extruding additional molten plastic material into the die and through the molten neck portion to form a parison integral with said neck parison, which parison is of substantially no greater outer diameter than an outer diameter of the neck portion.

6. In a method for blow molding a thermoplastic bottle which method includes the steps of injecting a given quantity of molten plastic material into a molding die to form a bottle neck portion, extruding, subsequent to formation of said bottle neck portion, additional molten plastic material into the die and through the molten neck portion to form a parison integral with said neck portion, and applying a pressure differential to the parison to produce a change in shape thereof.

7. A method for blow molding a thermoplastic bottle comprising the steps of, injecting molten plastic material into a molding die having a die cavity to form a bottle neck portion, extruding, subsequent to formation of said bottle neck portion, additional molten plastic material into the die and through the molten neck portion to form a parison integral with said neck portion, interrupting flow of plastic material to the die, and establishing a pressure differential to expand the parison into engagement with the die cavity.

8. A method for blow molding a thermoplastic bottle comprising the steps of, injecting molten plastic material into a molding die having a die cavity to form a bottle neck portion, extruding, subsequent to formation of said bottle neck portion, additional molten plastic material into the die and through the neck portion to form a parison integral with said neck portion, interrupting flow of plastic material to the die, admitting a pressurized medium into the parison to expand the parison into engagement with the die cavity, moving the unopened die from extruding position for cooling, and opening the die to remove the completed bottle therefrom.

9. A method for blow molding a thermoplastic bottle comprising the steps of, injecting molten plastic material into a die having a die cavity to form a bottle neck portion, extruding, subsequent to formation of said bottle neck portion, additional molten plastic material into the die and through the neck portion to form a parison integral with said neck portion, regulating the rate of parison formation, interrupting flow of plastic material to simultaneously discontinue extruding and to provide a finished edge about the opening of the neck portion, admitting a pressurized medium into the parison to expand the parison into engagement with the die cavity, moving the unopened die from extruding position for cooling, and opening the die to remove the completed bottle therefrom.

10. In a method of making a plastic container having a neck section and an expanded body portion, said method including the steps of urging a mass of molten plastic material from an annular extrusion orifice directly into an annular neck mold cavity, continuing the extrusion to force additional plastic material into and through said cavity to thereby extrude a peripherally unconfined, tubular extension integral with the neck section, terminating the flow of plastic when a desired length of tubing has been reached, and expanding at least a portion of said length in a blow mold to form said body portion.

11. A method for molding hollow items comprising the steps of, injecting molten plastic material into two adjoining neck molds to form two discrete neck portions, moving one of the molded neck portions away from the other molded neck portion while simultaneously injecting additional plastic material through one of said molded neck portions to form a tubular member extending between said neck portions and integral therewith, placing a die cavity in surrounding relation to the tubular member, subjecting the tubular member to a pressure differential to cause movement thereof into contact with the walls of the surrounding die cavity, and opening the die cavity to remove the hollow items therefrom.

12. A method for molding hollow items comprising the steps of injecting molten plastic material into two adjoining neck molds to form two discrete neck portions, moving one of the molded neck portions away from the other molded neck portion while simultaneously injecting additional plastic material through one of said molded neck portions to form a tubular member extending between said neck portions and integral therewith, placing a die cavity in surrounding relation to the tubular member, admitting a pressurized medium into the tubular portion to expand it into contact with the walls of the surrounding die cavity, and opening the die cavity to remove the hollow items therefrom.

13. A method for blow molding thermoplastic bottles in a split type die having multiple molding cavities which method includes the steps of, injecting molten plastic material into adjoining die bottle neck molds to form two discrete bottle neck portions, moving one of the molded neck portions away from the other molded neck portion while simultaneously injecting additional plastic material through one of said molded neck portions to form a tubular member extending between said neck portions and integral therewith, placing the split type die in surrounding relation to the tubular member, pinching the tube together to seal along a given line and divide the tube into two portions, subjecting each tube portion to a pressure differential to cause movement of each tube portion into engagement with the walls of the surrounding die cavity to form a bottle, and opening the molding die to remove the formed bottles.

14. A method for molding thermoplastic bottles in a split type die having multiple molding cavities which method includes the steps of, injecting molten plastic material into adjoining die bottle neck molds to form two discrete bottle neck portions, moving one of the molded neck portions away from the other molded neck portion while simultaneously injecting additional plastic material through one of said molded neck portions to form a tubular member extending between said neck portions and integral therewith, moving the split die to pinch the tube together and divide the tube into two portions, admitting fluid pressure medium into each tube portion to expand each tube portion into engagement with the wall of the surrounding die cavity to form a bottle, and opening the molding die to remove the formed bottles.

15. A method for molding thermoplastic bottles in a split type die having multiple molding cavities which method includes the steps of, injecting molten plastic material into adjoining die bottle neck molds to form two discrete bottle neck portions, moving the first of said molded neck portions away from the second molded neck portions away from the second molded neck portion while simultaneously injecting additional plastic material through said second molded neck portion to form a tubular member extending between the said neck portions and integral therewith, moving the split die to pinch the tube together and divide the tube into two portions, subjecting each tube portion to a pressure fluid to expand the tube portion into engagement with the wall of the surrounding cavity to form a bottle, and opening the molding die to remove the formed bottles.

16. A method for blow molding thermoplastic bottles in a split type die having multiple molding cavities which method includes the steps of, injecting molten plastic material into adjoining die bottle neck molds to form two discrete bottle neck portions, moving the first of said molded neck portions axially away from the second bottle neck portion while simultaneously injecting additional plastic material through the second molded neck portion to form a tubular member extending between said neck portions and integral therewith, moving the split die to pinch the tube together and divide the tube into two portions, subjecting each tube portion to a fluid pressure medium to expand each tube portion into engagement with the wall of the surrounding cavity to form a bottle, and opening the molding die to remove the formed bottles.

17. A method for blow molding thermoplastic bottles in a split type die having multiple molding cavities including separate adjoining split type bottle neck molds, which method includes the steps of, injecting molten plastic material into the bottle neck molds to form two discrete bottle neck portions, moving the first of said neck molds axially away from the second of said neck molds while simultaneously injecting additional plastic material through the second neck mold to form a tubular member extending axially between said neck portions and integral therewith, moving the split die to pinch the tube together and divide the tube into two portions, subjecting each tube portion to a pressure fluid medium to expand the walls thereof into engagement with the wall of the surrounding cavity to form a bottle, moving the split die and the neck molds away from engagement with the bottles so that they may be removed therefrom.

18. A method for blow molding thermoplastic bottles in a split type die having multiple molding cavities including separate split type bottle neck molds, which method includes the steps of placing the neck molds into engaging position, injecting molten plastic material into the neck molds to form two discrete bottle neck portions, moving the first of said neck molds axially away from engagement with the second of said neck molds while simultaneously injecting additional plastic material through the second neck mold to form a tubular member extending axially between said neck portions and integral therewith, moving the split die to pinch the tube together and divide the tube into two portions, admitting compressed air into each tube portion to expand the walls thereof into engagement with the wall of a surrounding cavity to form a bottle, moving the split die and neck molds away from the molded bottles, and separating the molded bottles.

19. In a method for molding thermoplastic bottles according to claim 18 wherein said bottle neck portions are formed to provide a threaded surface.

20. In a method for molding thermoplastic bottles according to claim 18, wherein the thermoplastic material is normally solid polyolefin.

21. In a method for molding thermoplastic bottles according to claim 18, wherein the thermoplastic material is polyethelene.

22. A method for blow molding thermoplastic bottles in a split type die having multiple molding cavities separated by web means formed to provide a waste material cavity with contiguous knife edges, which split type die includes separate split type bottle neck molds, the method including the steps of placing the neck molds into engaging relation, injecting molten plastic material into the neck molds to form two discrete bottle neck portions, moving the first of said neck molds axially from the second of said neck molds while simultaneously injecting additional plastic material through the second neck mold to form a tubular member extending axially between said neck portions and integral therewith, moving the split die to pinch the tube together and divide the tube into two disconnected portions, admitting compressed air itno each tube portion to expand the walls thereof into engagement with the wall of a surrounding molding cavity to form a bottle, and moving the split die and neck molds away from the molded bottles to release the bottles from the die and neck molds.

23. In a method of making a plastic container having a neck section and an expanded body portion, said method including the steps of urging a mass of molten plastic material from an annular extrusion orifice directly into an annular neck mold cavity, continuing the extrusion to force additional plastic material into and through said cavity to thereby extrude a peripherally unconfined, tubular extension integral with the neck section, terminating the flow of plastic when a desired length of tubing has been reached, and expanding at least a portion of said length in a blow mold to form said body portion.

24. In a plastic molding apparatus, means defining an extrusion orifice, a core pin projecting beyond the orifice, separable first injection mold sections surrounding the core pin and defining therewith a first mold cavity, separable second injection mold sections in face-to-face abutment with the first mold section, a mandrel interiorly of said second mold sections and cooperating therewith to define a second mold cavity, said mold cavities being in registry with one another, the mandrel abutting the core pin and said second mold cavity communicating with the orifice through said first mold cavity, means for expressing molten plastic material from said orifice into said cavities and means for retracting said second mold sections from contact with said first mold sections while additional material is expressed from said orifice to form a tube exteriorly of said mold cavities and joined to the material therein.

25. In a plastic molding apparatus, means defining an extrusion orifice, a core pin projecting beyond the orifice, said core pin being axially movable and having a first portion which is of less diameter than the diameter of the orifice and a second portion which is substanitally the same diameter as the orifice, said second portion acting as a closure means for the orifice to restrict flow of plastic material through the orifice in one position of core pin movement, separable first injection mold sections surrounding the core pin and defining therewith a first mold cavity, separable second injection mold sections in face-to-face abutment with the first mold sections, a mandrel interiorly of said second mold sections and cooperating therewith to define a second mold cavity, said mold cavities being in registry with one another, the mandrel abutting the core pin and said second mold cavity communicating with the orifice through said first mold cavity, means for expressing molten plastic material from said orifice into said cavities, and means for retracting said second mold sections from contact with said first mold sections while additional material is expressed from said orifice to form a tube exteriorly of said mold cavities and joined to the material therein.

26. An apparatus for making a necked article from plasticized material extruded through an annular orifice, comprising an orifice core centrally disposed within and projecting beyond the orifice, separable mold means arranged in peripherally spaced relation to the projecting portion of the orifice core to define therebetween an annular mold space conforming only to the neck portion of the article, closure means abuttable with said mold means to completely close the annular mold space and thereby define an injection mold cavity, means for moving said closure means from its abutting relation to accommodate the extrusion of a tube through the annular mold space.

27. An assemblage for blow molding a thermoplastic bottle comprising, a molding die, an extruding head including a mandrel means, said molding die being positioned adjacent the extruding die and being formed with an opening which receives in spaced relation said mandrel means, a plunger slidably arranged in the molding die and adapted to form the bottom of a neck cavity, said extruding die being arranged to inject a plastic material into the molding die opening and about said mandrel to form a neck portion of a bottle within the neck cavity and to continue such injection while the plunger is being moved away from said opening to form a closed bottom parison having an elongated wall, means to cut off flow of plastic material into said opening after the parison has been formed, and means to establish a pressure differential upon the wall of the parison to expand the parison into engagement with an inner wall of the molding die.

28. An assemblage for blow molding a thermoplastic bottle according to claim 27, wherein said plunger is formed to provide a sub-atmospheric pressure area on the end of said plunger which seats upon the inner edge of the molding die opening.

29. An assemblage for blow molding a thermoplastic bottle comprising, a split type molding die being formed to provide a cavity and an opening at one end which leads into said cavity, a plunger slidably arranged in said molding die and adapted to form the bottom of a neck cavity, an extruding die including a lower section and an upper section, said lower section being formed to provide a cylindrical opening, a sleeve member slidably arranged in said upper section, a tube positioned within said sleeve member the lower end of said tube forming a mandrel projecting into the molding die opening, a valve arranged in said tube and in spaced relation to the inner wall thereof said valve being adapted to engage a valve seat formed within said mandrel, and means to admit pressurized plastic material into the cylindrical opening for flow into the neck cavity to form the neck portion of a bottle and to continue such flow as the plunger is moved away from engagement with the edge of said molding die opening to form a closed end parison, said sleeve being movable to shut off flow of plastic material into said molding die opening, said valve being movable from engagement with said valve seat to allow flow of pressurized medium within the formed parison to expand the wall thereof into engagement with said cavity.

30. An apparatus for making a necked article from plasticized material extruded through an annular orifice, comprising an orifice core centarlly disposed within and projecting beyond the orifice, separable mold means arranged in peripherally spaced relation to the projecting portion of the orifice core to define therebetween an annular mold space conforming only to the neck portion of the article, closure means abuttable with said mold means to completely close the annular mold space and thereby define an injection mold cavity, means for moving said closure means from its abutting relation to accommodate the extrusion of a tube through the annular mold space.

31. An apparatus for making a necked article from plasticized material extruded through an annular orifice, comprising an orifice core centrally disposed within and projecting beyond the orifice, separable mold means arranged in peripherally spaced relation to the projecting portion of the orifice core to define therebetween an annular mold space conforming only to the neck portion of the article, means defining cooling passageways within said mold means in operative juxtaposition to said annular mold space, closure means abuttable with said mold means to completely close the annular mold space and thereby define an injection mold cavity, means for moving said closure means from its abutting relation to accommodate the extrusion of a tube through the annular mold space.

References Cited

UNITED STATES PATENTS

| | | | |
|---|---|---|---|
| 2,804,654 | 9/1957 | Sherman | 18—55 |
| 2,861,295 | 11/1958 | Hagen et al. | 18—5 |
| 2,936,481 | 5/1960 | Wilkalis et al. | 18—5 |

ROBERT F. WHITE, *Primary Examiner.*

A. R. NOE, *Assistant Examiner.*